United States Patent [19]

Peters

[11] Patent Number: 4,510,802

[45] Date of Patent: Apr. 16, 1985

[54] ANGULAR RATE SENSOR UTILIZING TWO VIBRATING ACCELEROMETERS SECURED TO A PARALLELOGRAM LINKAGE

[75] Inventor: Rex B. Peters, Woodinville, Wash.

[73] Assignee: Sundstrand Data Control, Inc., Redmond, Wash.

[21] Appl. No.: 528,774

[22] Filed: Sep. 2, 1983

[51] Int. Cl.³ .................. G01C 19/56; G01C 23/00; G01P 15/08
[52] U.S. Cl. .................................. 73/505; 73/510; 73/517 R
[58] Field of Search ............... 73/505, 510, 516 R, 73/517 R, 517 B

[56] References Cited

U.S. PATENT DOCUMENTS 2,544,646  3/1951  Barnaby et al. ................ 73/505

Primary Examiner—James J. Gill
Attorney, Agent, or Firm—Michael B. McMurry; Ted E. Killingsworth; Harold A. Williamson

[57] ABSTRACT

In an inertial system for sensing the angular rotation and translational motion of a structure utilizing a pair of accelerometers in a back-to-back arrangement vibrating substantially linearly along an axis normal to their force sensing axes, a mechanism utilizing a parallelogram structure is used to impart the vibratory motion to the accelerometers.

28 Claims, 5 Drawing Figures

ANGULAR RATE SENSOR UTILIZING TWO VIBRATING ACCELEROMETERS SECURED TO A PARALLELOGRAM LINKAGE

RELATED APPLICATIONS

The subject matter of the application is related to the co-pending patent applications Merhav Ser. No. 357,714 filed on Mar. 12, 1982 now U.S. Pat. No. 4,445,376, Ser. No. 357,715 filed on Mar. 12, 1982, now abandoned in favor of continuation-in-part application Ser. No 528,776 filed on Sept. 2, 1983 which are directed to apparatus and methods for measuring specific force and angular rate of a moving body utilizing cyclically moving accelerometers.

TECHNICAL FIELD

The invention relates to an apparatus for determining the rate of angular rotation and translational motion of a structure utilizing vibrating accelerometers and in particular an apparatus utilizing two accelerometers vibrating in a substantially linear direction.

BACKGROUND OF THE INVENTION

In the above cited patent application Ser. No. 357,714 as well as the article by Shmuel J. Merhav entitled "A Nongyroscopic Inertial Measurement Unit" published May 1981 by Technion Israel Institute of Technology, a method and apparatus for measuring the specific force vector and angular rate vector of a moving body by means of a plurality of cyclically driven accelerometers is disclosed. The co-pending patent application Ser. No. 357,715 cited above discloses similar techniques for measuring the specific force vector and angular rate vector of a moving body utilizing either a single or a pair of accelerometers vibrating at a constant frequency.

In the Merhav patent application Ser. No. 526,776 filed Sept. 2, 1983, one of the embodiments of the rate sensor utilizing two vibrating accelerometers is an arrangement whereby the accelerometers are orientated in a back-to-back arrangement, that is with their force sensing axes aligned in opposite directions, and wherein the accelerometers are vibrated in a substantially linear direction normal to the force sensing axes. One application of such a rate sensor would be in an inertial reference system that could be used in an aircraft inertial navigation system. In such an application, it is important to keep the mechanism for vibrating the accelerometers as simple as possible as well as to reduce the size and the cost of the system. It is also considered very desirable to eliminate insofar as possible the number of parts that can wear in such a system.

SUMMARY OF THE INVENTION

It is therefore an object of the invention to provide a mechanism for vibrating two accelerometers in a substantially linear direction utilizing a parallelogram structured linkage.

It is an additional object of the invention to provide an apparatus for generating a signal representing the angular rate motion of a structure that includes first and second accelerometers each having a force sensing axis; a parallelogram mechanism including a first accelerometer support member holding the first accelerometer, a second accelerometer support member holding the second accelerometer and a linkage mechanism attached to the accelerometer support members and secured to the structure such that the force sensing axes are aligned in parallel. The apparatus also includes a drive mechanism to vibrate the accelerometer support members in a direction substantially normal to the accelerometer force sensing axes at a frequency $\omega$ and a signal processing circuit for generating a rate signal representing the angular rate motion of the structure.

It is a further object of the invention to provide an angular rate sensing accelerometer structure that includes a central support member; a first linkage member pivotably connected to one end of the central support member; a second linkage member pivotably connected to the other end of the central support member; a first accelerometer support member pivotably connected to one end of each of the linkage members; and a second accelerometer support member pivotably connected to the other end of the linkage members. The structure also includes a first accelerometer secured to the first accelerometer support member such that its force sensing axis is generally normal to the first accelerometer support member and a second accelerometer secured to the second accelerometer support member such that its force sensing axis is generally normal to the second accelerometer support member and parallel to the force sensing axis of the first accelerometer. This structure additionally includes a drive mechanism connected to the central support member and one of the linkage members for vibrating the accelerometers at a frequency $\theta$ through an angle $\theta$.

DETAILED DESCRIPTION OF THE INVENTION

Figure 1:
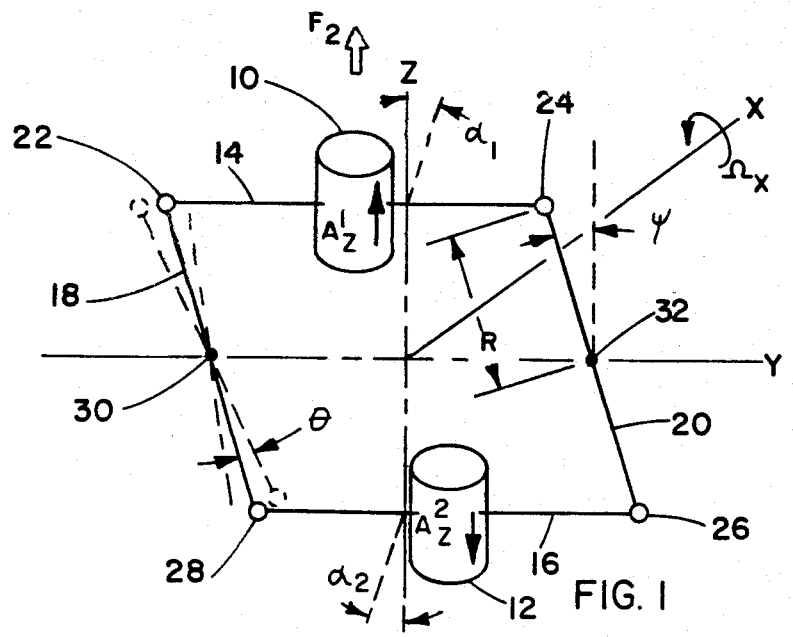
FIG. 1 is a diagram providing a conceptual illustration of a parallelogram linkage for vibrating two accelerometers in a substantially linear direction.

In FIG. 1 is provided in diagramatic form an illustration of a parallelogram arrangement for vibrating two accelerometers 10 and 12 in a direction indicated by the Y axis. The accelerometers 10 and 12 are secured on accelerometer support members 14 and 16 respectively which in turn are connected to a pair of linkage members 18 and 20 by pivot or bearing arrangements 22–28. When the linkage members 18 and 20 are rotated about pivots 30 and 32 respectively through an angle $\theta$ the accelerometers 10 and 16 will vibrate along the Y axis which is normal to their force sensing axes $A_z^1$ and $A_z^2$. In the diagram of FIG. 1 the angle $\Psi$ presents an initial offset about which the oscillation through angle $\theta$ occurs.

The accelerations resulting from the motion of the accelerometer support members 14 and 16 in the Y direction measured along and penpendicular to the accelerometer force sensing axes $A_z^1$ and $A_z^2$ one given by Eq. (1) and one given by Eq. (2) below, respectively:

$$\ddot{Z} = \omega^2 R \cos \Psi \theta_o^2 \cos 2\omega t + \omega^2 R \theta_o \sin \Psi \sin \omega t \quad (1)$$

$$\ddot{Y} = \omega^2 R \cos \Psi \theta_o \sin \omega t \quad (2)$$

where $\omega$ represents the frequency of angular rotation through the angle $\theta$ and R represents the length of the linkage arm 18 or 20 from one of the central pivots 30 or 32 to one of the accelerometer support pivots 22-28. As may be appreciated from Eq. (1) and Eq. (2), the accelerations along the Z axis of accelerometers 10 and 12 due to the motion of the mechanism illustrated in FIG. 1 are relatively small for small values of $\theta$ and will essentially cancel out in the signal processor shown in FIG. 4. Therefore, it should be apparent from FIG. 1 that the primary motion of accelerometers 10 and 12 is essentially linear along the Y axis for small angles of $\theta$ and $\Psi$. In the preferred embodiment of the invention, $\Psi_o$ would have a value of 0.01-0.1 radians and $\omega$ would be less than 0.01 radians. Also in the preferred embodiment of the invention the frequency $\omega$ would be 200-400 radians/second. Further significance of the input axis motion described in Eq. (1) will be discussed in connection with the drive signal generator of FIG. 5.

Figure 2:
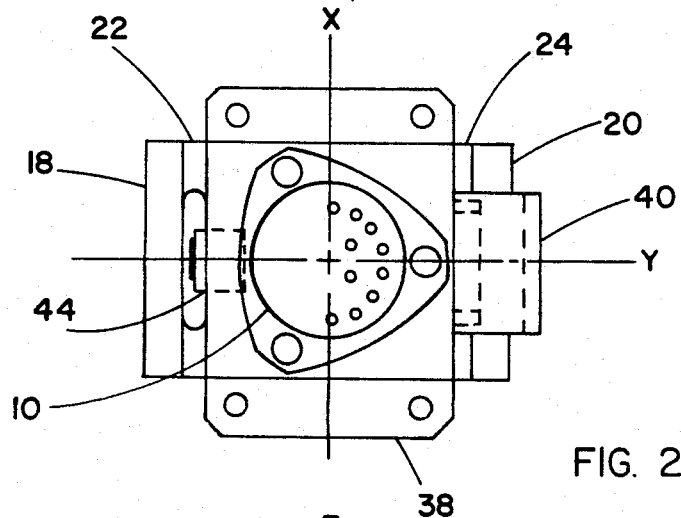
FIG. 2 and FIG. 3 are top and side views respectively of a mechanism for implementing the accelerometer motion illustration in FIG. 1.
Figure 3:
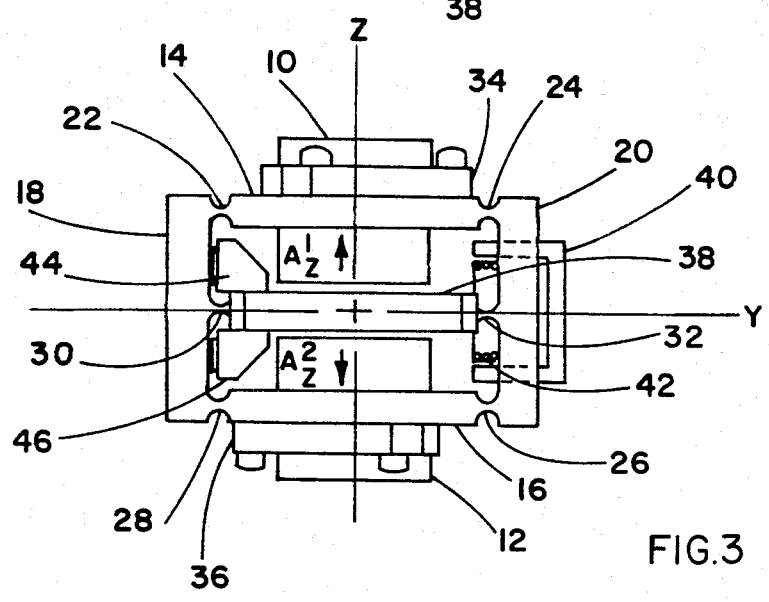

In FIGS. 2 and 3 is illustrated the preferred embodiment of a mechanism for implementing the parallelogram structure of FIG. 1. As can be seen from the side view of FIG. 3, accelerometers 10 and 12 are secured to the accelerometer support members 14 and 16 by accelerometer flange members 34 and 36. In order to simplify the structure and to minimize wear, the pivots 20-28 that connect the accelerometer support members 14 and 16 to the linkage members 18 and 20 are implemented in the preferred embodiment of the invention as thin metal flexures. Similarly the pivots 30 and 32 which connect the linkage members 18 and 20 to a central support member 38 are implemented in the form of thin metal flexures. The central support member 38 is connected to the structure (not shown) for which the apparatus for FIGS. 2 and 3 is to provide signals indicating angular rotation and translational motion.

A drive mechanism of the D'Arsonval type that includes a permanent magnet 40 attached to linkage member 20 and a coil 42 secured to a central support member 38 drives the accelerometers 10 and 12 in parallel but opposite directions generally along the Y axis as illustrated in FIG. 1. The amplitude $\theta$ of vibration may be controlled by means of a servo feedback loop utilizing a pair of capacitive pick-off elements 44 and 46 as shown in FIG. 3.

The apparatus shown in FIGS. 2 and 3 provides a uniquely simple mechanism with a minimum of moving parts for vibrating a pair of accelerometers 10 and 12 substantially in a linear motion along an axis Y normal to the force sensing axis $A_z^1$ and $A_z^2$ of the accelerometers.

Figure 4:
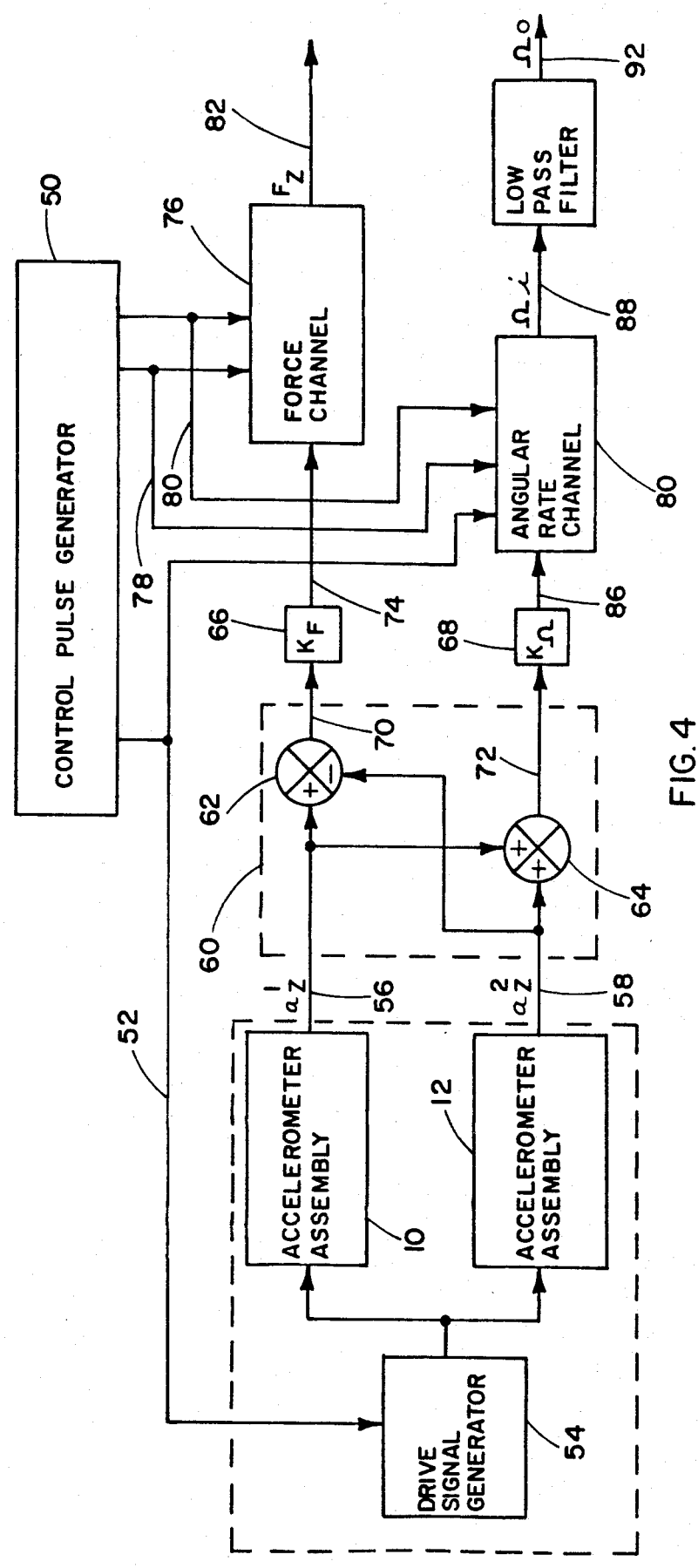
FIG. 4 is a block diagram of a processor circuit for converting accelerometer signals into angular rate and force signals.

A signal processor for separating the force signals $F_z$ from the angular rate signals $\Omega_x$ and the output signals of accelerometers 10 and 12 is provided in FIG. 4. A control pulse generator 50 generates signals on a line 52 as a function of the frequency $\omega$ that will cause a drive signal generator 54 to vibrate the accelerometers 10 and 12 at frequency $\omega$ as previously desribed. The output signals of the accelerometers 10 and 12 $a_z^1$ and $a_z^2$ are transmitted over lines 56 and 58 to a preseparation processor 60. The preseparation processor 60 shown in FIG. 4 is appropriate for a paired accelerometer mechanization of the type shown in FIG. 1 where the force sensing axes $A_z^1$ and $A_z^2$ are aligned in opposite directions. The accelerometer output signals at lines 56 and 58 are differenced in a summing junction 62 and summed in a summing junction 64. A pair of scaling amplifiers 66 and 68 receive the summed and differenced signals from summing junctions 64 and 62 respectively over lines 70 and 72.

The principle force separation is the same as the one disclosed in the previously cited Merhav application Ser. No. 357,715 and the article by Shmuel J. Merhav entitled "A Nongyroscopic Inertial Measurement Unit" published May 1981 by Technion Israel Institute of Technology wherein the combined signal from amplifier 66 is provided over a line 74 to a force channel 76. The force channel 76 includes an integrating circuit and a sample and hold circuit with signals from the control pulse generator 50 being applied over lines 78 and 80 to the integrating and sample and hold circuits. The combined acceleration signals on lines 74 are integrated over the time period T of the frequency $\omega$ to provide a force signal $F_z$ on line 82 that represents the change in velocity along the axis Z of the structure to which the central support member is attached.

Similarly, an angular rate channel processor 84 receives the differenced signals over line 86 and multiplies them by the zero mean periodic function sgnc$\omega$t. As with the force channel, the resulting signal is integrated over a time period T through a sample and hold circuit to an output line 88. The signal $\Omega_i$ representing angular rate information is transmitted through a low pass filter 90 and output on a line 92.

In the above manner signals from the accelerometer arrangement illustrated in FIGS. 1-3 can be processed to produce force signals and angular rate signals.

Figure 5:
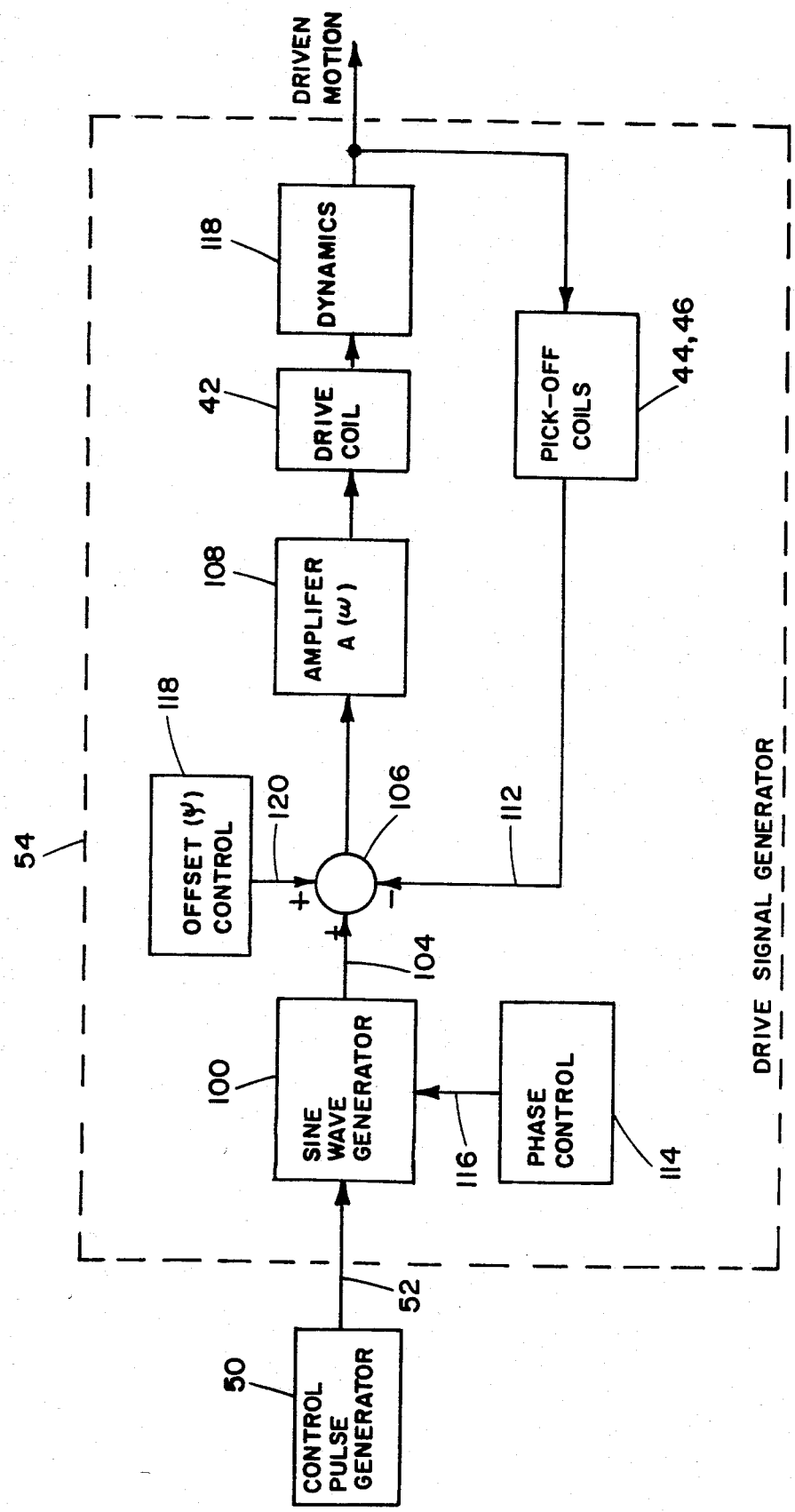
FIG. 5 is a block diagram of a drive signal generator for use with the processor circuit of FIG. 4.

Further detail of the preferred embodiment of the drive signal generator 54 is shown in FIG. 5. Pulses from the control pulse generator 50 are sent along line 52 to a sine wave generator 100 which produces a substantiallly sinusoidal voltage on line 104. The output of a summing junction 106 drives a high gain amplifier 108. The output of amplifier 108 is a current which is applied to the drive coil 42. The torque output of the drive coil 42 interacts with the dynamics of the mechanism of FIGS. 1-3 represented by the box 110 to produce the driven motion of the accelerometers. This driven motion excites the pick-off coils 44 and 46 to produce a feedback voltage on line 112. In accordance with servo theory well known to those skilled in the art, the gain $A(\omega)$ of the amplifier 108 is made very high so that the drive voltage on line 104 and the feedback voltage on line 112 are forced to be substantially equal and the motion of the mechanism will substantially follow the drive voltage on line 104. Additional controls to be used during the calibration of the angular rate sensing apparatus of FIGS. 1-3 are shown at 114 and 118. Phase control circuit 114 is a circuit which produces an adjustable voltage on line 116 which controls the phase of the output 104 of sine wave generator 100 relative to the control pulses on line 52. Offset control circuit 118 is a circuit which produces an adjustable voltage on line 120 to control the mean angle $\Psi$ of the mechanism illustrated in FIG. 1.

The reason for having the adjustments 114 and 118 included in th circuit may be found by examining the behavior of the processor with respect to the acceleration shown in Eq. (1). The first term in Eq. (1) represents a small twice frequency acceleration which would not be present in a purely translational mechanism and therefore represents a compromise in the design that is accepted in order to achieve a simple mechanism. It is a very small compromise since it can be shown to cancel exactly in the processor for steady state drive motion and also to cancel substantially even in the presence of drive jitter. The second term represents a signal identical to that which would be caused by a common mode misalignment of the two accelerometer through an angle $\Psi$.

It can be shown that the processor of FIG. 4, when subjected to both phase shift in the drive signal $\phi$ and misalignment of the force sensing axes $A_z^1$ and $A_z^2$ of the accelerometers 10 and 12 with respect to the Z axes $\alpha_1$ and $\alpha_2$ respectively, as shown in FIG. 1, will produce an apparent rate bias given by:

$$\Omega_b = w/4 \, (\alpha_1 + \alpha_2) \sin \phi \tag{3}$$

For example, with $\omega = 200$ radians per second, $\alpha_1 = \alpha_2 = 0.001$ radian, and $\phi = 0.001$ radian, Eq. (3) reveals that an apparent rate bias of $10^{-4}$ radians per second, or 20.6°/hour will result. The electrical adjustment of $\Psi$ allows the adjustment of $\alpha_1$ and $\alpha_2$ to a relatively large value without mechanical adjustments so that $\phi$ can be set to a very small value by observing $\Omega_b$. $\phi$ can then be offset exactly 90° by temporarily altering the connections of the timing signals on lines 78 and 80 so that the sum of the misalignment angles $\alpha_1$ and $\alpha_2$ can be adjusted to zero by adjusting $\Psi$, again while observing $\Omega_b$. When $\phi$ is again returned to zero and all controls locked in place, the apparatus will not only have been adjusted for minimum value of $\Omega_b$, but also for minimum drift in $\Omega_b$ in case $\alpha_1$, $\alpha_2$, or $\phi$ should exhibit aging drift following calibration. The ability to adjust $\Psi$ electrically allows this entire procedure to be accomplished quickly, precisely, and without need for critical mechanical adjustments.

I claim:

1. An apparatus for generating a signal representing the angular rate motion of a structure comprising:
   a first accelerometer having a first force sensing axis;
   a second accelerometer having a second force sensing axis;
   a parallelogram mechanism including a first accelerometer support member secured to said first accelerometer, a second accelerometer support member secured to said second accelerometer and a linkage mechanism attached to said first and said second accelerometer support members and secured to the structure such that said first and said second force sensing axes are aligned in parallel;
   drive means operatively connected to said parallelogram mechanism for vibrating said first and second accelerometer support members in a direction substantially normal to said first and second force sensing axes at a frequency $\omega$; and
   signal processing means operatively connected to said first and second accelerometers for generating a rate signal representing the angular rate motion of the structure.

2. The apparatus of claim 1 wherein said linkage mechanism includes a first linkage member pivotably connected to said first and second accelerometer support members, a second linkage member pivotably connected to said first and second accelerometer support members and a central support member secured to the structure and pivotably connected to said first and second linkage members.

3. The apparatus of claim 2 wherein said drive means includes a first electromagnetic drive member secured to said central support member and a second electromagnetic drive member secured to said first linkage member.

4. The apparatus of claim 2 wherein said first and second linkage members are pivotably connected to said first and second accelerometer support members by flexures.

5. The apparatus of claim 4 wherein said central support member is pivotably connected to said first and second linkage members by flexures.

6. The apparatus of claim 1 wherein said drive means vibrates said first and second accelerometers through an angle $\theta$ of 0.01–0.1 radians.

7. The apparatus of claim 1 wherein said frequency $\omega$ is a constant frequency of 200–400 radians per second.

8. The apparatus of claim 11 wherein said first and second accelerometers are vibrating through an angle $\theta$ offset by an angle $\Psi$ from a nominal position and wherein said drive means includes adjustment means for adjusting the offset angle $\Psi$ to a desired value.

9. The apparatus of claim 1 wherein said drive means includes phase control means for adjusting the phase of the vibration of said first and second accelerometers.

10. The apparatus of claim 1 wherein said drive means includes:
    a periodic signal generator circuit for generating an output signal having the frequency $\omega$;
    an amplifier circuit operatively connected to said periodic signal generator for amplifying the output of said periodic signal generator;
    a drive element operatively connected to said parallelogram mechanism and responsive to said amplified periodic signal for vibrating said first and second accelerometers at said frequency $\omega$; and
    feedback means responsive to the position of said parallelogram mechanism for applying a feedback signal to said amplifier circuit to control the amplitude $\theta$ of the vibration of said first and second accelerometers.

11. The apparatus of claim 10 additionally including adjustment means for adjusting an offset angle $\Psi$ representing the deviation from a nominal position of the vibration $\theta$, to a desired value.

12. The apparatus of claim 11 wherein said adjustment means includes a voltage supply circuit for applying an adjustable voltage to said amplifier circuit.

13. The apparatus of claim 10 additionally including a phase control circuit operatively connected to said periodic signal generator effective to vary the phase of the frequency $\omega$ at which said first and second accelerometers are vibrated.

14. An angular rate sensing accelerometer structure comprising:
    a central support member;
    a first linkage member pivotably connected to one end of said central support member;
    a second linkage member pivotably connected to the other end of said central support member;
    a first accelerometer support member pivotably connected to one end of each of said first and second linkage members;
    a first accelerometer secured to said first accelerometer support member such that its force sensing axis is generally normal to said first accelerometer support member;
    a second accelerometer support member pivotably connected to said other end of each of said linkage members; and a second accelerometer secured to said second accelerometer support member such that its force sensing axis is generally normal to said first accelerometer support member and generally parallel to the force sensing axis of said first accelerometer.

15. The structure of claim 14 wherein the force sensing axes of said first and second accelerometers are generally parallel to said first and second linkage members.

16. The structure of claim 15 wherein the force sensing axes of said first and second accelerometers are in opposite directions.

17. The structure of claim 14 wherein said first and second linkage members are connected to said central support member by flexures.

18. The structure of claim 17 wherein said first and second linkage members are connected to said first and second accelerometer support members by flexures.

19. The structure of claim 14 additionally including a drive mechanism operatively connected to said central support member and said first lineage member for vibrating said first and second accelerometer support members at a frequency $\omega$.

20. The apparatus of claim 19 wherein said drive mechanism includes a first electromagnetic drive member secured to said support member and a second electromagnetic drive member secured to said first linkage member.

21. The apparatus of claim 19 wherein said frequency $\omega$ is a constant frequency of 200–400 radians per second.

22. The apparatus of claim 21 wherein said drive mechanism vibrates said first and second accelerometers through an angle $\theta$ of 0.01–0.1 radians.

23. A drive signal generator circuit for vibrating at least one accelerometer in an inertial measurement system at a frequency $\omega$ comprising:
- a periodic signal generator circuit for generating an output signal having the frequency $\omega$;
- an amplifier circuit operatively connected to said periodic signal generator circuit for amplifying the output of said periodic signal generator;
- a drive element operatively connected to said accelerometer and responsive to said amplified periodic signal for vibrating the accelerometer at frequency $\omega$; and
- feedback means responsive to the position of the accelerometer for applying a feedback signal to said amplifier circuit to control the amplitude of the vibration.

24. The circuit of claim 23 additionally including adjustment means for adjusting the position of the center point about which the accelerometer vibrates.

25. The circuit of claim 24 wherein said adjustment means includes a voltage supply circuit for applying an adjustable voltage to said amplifier circuit.

26. The circuit of claim 23 additionally including a phase control circuit operatively connected to said periodic signal generator effective to vary the phase of the frequency $\omega$ at which the accelerometer is vibrated.

27. A drive signal generator circuit for vibrating at least one accelerometer at a frequency $\omega$ in an inertial measurement system comprising:
- a pulse generator for generating pulses at a frequency that is a function of $\omega$;
- a sine wave generator circuit connected to said pulse generator and responsive to said pulses for generating a sinusoidal drive signal for a frequency $\omega$;
- a high gain amplifier circuit connected to said sine wave generator for amplifying said sinusoidal drive signal;
- a drive element operatively connected to the accelerometer and said high gain amplifier and responsive to said amplified drive signal to vibrate the accelerometer at a frequency $\omega$;
- feedback means including a position element for generating a feedback signal indicating the amplitude of accelerometer vibration and for applying said feedback signal to said high gain amplifier; and
- a vibration phase control circuit operatively connected to said sine wave generator.

28. A drive signal generator circuit for vibrating at least one accelerometer at a frequency $\omega$ in an inertial measurement system comprising:
- a pulse generator for generating pulses at a frequency that is a function of $\omega$;
- a sine wave generator circuit connected to said pulse generator and responsive to said pulses for generating a sinusoidal drive signal for a frequency $\omega$;
- a high gain amplifier circuit connected to said sine wave generator for amplifying said sinusoidal drive signal;
- a drive element operatively connected to the accelerometer and said high gain amplifier and responsive to said amplified drive signal to vibrate the accelerometer at a frequency $\omega$;
- feedback means including a position sensing element for generating a feedback signal indicating the amplitude of accelerometer vibration and for applying said feedback signal to said high gain amplifier; and
- an adjustment circuit operatively connected to said high gain amplifier circuit for applying a voltage to said high gain amplifier circuit for adjusting the position of the center point about which the accelerometer vibrates.

* * * * *